2,863,748

PRODUCTION OF FUEL GASES

Ernst Bartholomé, Heidelberg, Germany, assignor to Badische Anilin- & Soda-Fabrik Aktiengesellschaft, Ludwigshafen (Rhine), Germany No Drawing. Continuation of application Serial No. 329,151, December 31, 1952. This application February 26, 1957, Serial No. 642,367

Claims priority, application Germany January 5, 1952

9 Claims. (Cl. 48—197)

This invention relates to a new and improved method of producing fuel gases, in particular synthesis gases, from gaseous or liquid and coarse-sized solid fuels.

This application is a continuation of my copending application, Serial No. 329,151, filed December 31, 1952, and now abandoned.

The conversion of gaseous or liquid hydrocarbons into carbon monoxide and hydrogen by partial oxidation with oxygen in a flame is known to be attended with the formation of carbon black which seriously interferes with the further processing of the gas produced. By the addition of steam or by raising the reaction temperature or increasing the addition of oxygen the formation of carbon black can be diminished, but not completely suppressed.

According to the prior art teaching, the formation of carbon black can be completely suppressed in the conversion of hydrocarbons into carbon monoxide and hydrogen by partial oxidation by conducting the flame reaction in the presence of small amounts of finely dispersed or vapor-phase compounds of the elements of the second group of the periodic system and the metals of the iron group. When treated by this method the resulting gas, it is true, contains no more carbon black, but the compounds added may prove a nuisance in the further processing of the gas. As a result, this flame reaction cannot be combined in all cases with a subsequent catalytic reaction, for example with a reaction by which the non-converted part of the hydrocarbons reacts endothermically with steam or carbon dioxide while utilizing the sensible heat of the flaming gases, for the reason that the catalyst bed gets clogged by the compounds as the reaction proceeds. When no such combination is made, however, the gas needs a high consumption of oxygen for its production and, as a consequence, the process becomes unsatisfactory under an economical aspect.

I have now found and this is the object of my invention that gaseous and liquid fuels, more specifically hydrocarbon mixtures, can be converted into carbon monoxide and hydrogen by partial oxidation with oxygen or gases containing oxygen in the presence of at least one of the aforesaid metal compounds as a catalyst, with no carbon black being formed, while utilizing the sensible heat of the off-gases of the flame reaction for the production of additional carbon monoxide and hydrogen by passing the off-gases of the flame reaction through a gas producer that operates on the liquid slag discharging principle and is charged with coarse-sized, solid, carbonaceous fuels, such as coke, mineral coal, briquettes or the like, arranged in a fixed bed. The foregoing gas producer is also referred to as a slagging gas generator and is described, for example, in Industrial and Engineering Chemistry, 1948, page 559, particularly page 578. In the gasification of the hydrocarbon, carbon monoxide and hydrogen are substantially formed along with some carbon dioxide and water. In addition to oxygen or gases containing oxygen endothermic gasifying agents, such as steam and carbon dioxide, may also be used.

The preferred compounds which may be selected as a catalyst to suppress the formation of carbon black are well known in the art. Suitable catalysts, for example, include compounds of metals of the second group of the periodic system and of the iron group. Compounds found to be especially useful are, for example, the nitrates, chlorides or hydroxides of magnesium, calcium, strontium, and barium together with nitrates or sulfates of iron, cobalt and nickel.

In the practice of my invention the gaseous or liquid fuels may be gasified in a gasification chamber which forms an element of its own apart from the gas producer, but is attached thereto so that an operational system exists. In a preferred embodiment it is attached to the bottom part of the gas producer so that the gases, when leaving the separate gasification chamber, directly pass into the bottom part of the gas producer.

An alternative embodiment of my invention provides introducing the gaseous or liquid fuels and the gasifying agents directly into the bottom part of the gas producer by means of a burner so that the gasification of the gaseous or liquid fuels is achieved in the gas producer itself, directly at the burner mouth or near by.

By the process according to my invention the consumption of oxygen for the carbon monoxide/hydrogen blend produced is cut down to an appreciable extent. Another advantage resides in the fact that the metal compounds contained in the gases and fed to the flame are removed from the gas producer together with the fused ash constituents of the solid fuel. For example, when the gas producer is charged with metallurgical coke, a synthesis gas of high purity is obtained which is equal in quality to a synthesis gas which has been produced from metallurgical coke in runoff gas producers. When non-caking coal is used as the charge of the gas producer, a fuel gas is obtained which is completely free of carbon black and of the compounds which have been fed to the flame. The process according to my invention affords the special advantage that by suitably proportioning the quantities of the gasifying agents and the hydrocarbons, the consumption of coke in the gas producer can be cut down quite appreciably and, as a consequence, the produced gases, in particular the synthesis gases, mainly originate from the hydrocarbons introduced. The preferred types of hydrocarbons used in the practice of my invention are readily available oil residues, natural gas and waste oils.

The following examples serve to illustrate the nature of my invention and how the same is to be carried out in practice, but the invention is not restricted to these examples.

Example 1

100 kilograms (per hour) of diesel oil having a content of 86 percent of carbon and 13 percent of hydrogen and a net calorific power of 10,000 kilogram-calories for each kilogram are gasified with 97 m.$^3$ (N. T. P.) (per hour) of oxygen and 40 kilograms (per hour) of steam, which has been previously heated to 500° C., in the presence of 2 grams (per hour) of calcium hydroxide and 2.5 grams (per hour) of ferric sulfate, in an atomized state. The hot gases are fed into a runoff gas producer which is charged with coke. At a gasification rate of 28.5 kilograms per hour of coke 401 m.$^3$ (N. T. P.) of a gas are produced per hour which contains 362 m.$^3$ (N. T. P.) of carbon monoxide and hydrogen and 39 m.$^3$ (N. T. P.) of carbon dioxide and water.

Example 2

100 kilograms (per hour) of diesel oil having a content of 86 percent of carbon and 13 percent of hydrogen and a net calorific power of 10,000 kilogram-calories for each kilogram are gasified with 97 m.$^3$ (N. T. P.)

(per hour) of oxygen and 40 kilograms (per hour) of steam, which has been previously heated to 500° C., in the presence of 2 grams (per hour) of calcium nitrate and 0.5 gram (per hour) of nickel nitrate, in an atomized state. The hot gases are fed into a runoff gas producer which is charged with coke. At a gasification rate of 28.5 kilograms per hour of coke 401 m.³ (N. T. P.) of a gas are produced per hour which contain 362 m.³ (N. T. P.) of carbon monoxide and hydrogen and 39 m.³ (N. T. P.) of carbon dioxide and water.

*Example 3*

100 kilograms (per hour) of diesel oil having a content of 86 percent of carbon and 13 percent of hydrogen and a net calorific power of 10,000 kilogram-calories for each kilogram are gasified with 97 m.³ (N. T. P.) (per hour) of oxygen and 40 kilograms (per hour) of steam, which has been previously heated to 500° C., in the presence of 5 grams (per hour) of barium nitrate and 1.0 gram (per hour) of nickel sulfate, in an atomized state. The hot gases are fed into a runoff gas producer which is charged with coke. At a gasification rate of 28.5 kilograms per hour of coke 401 m.³ (N. T. P.) of a gas are produced per hour which contains 362 m.³ (N. T. P.) of carbon monoxide and hydrogen and 39 m.³ (N. T. P.) of carbon dioxide and water.

The invention is hereby claimed as follows:

1. A process for producing a carbon monoxide- and hydrogen-containing fuel gas which comprises: gasifying a fluid hydrocarbon fuel by partial oxidation with an oxygen-containing gas in a flame reaction in the presence of a dispersed finely divided catalyst to produce principally carbon monoxide and hydrogen, said catalyst being adapted to suppress the formation of carbon black; passing the resulting hot gases containing said finely divided catalyst through and in contact with a solid carbonaceous fuel arranged in a fixed bed and undergoing gasification with the formation of liquid slag for the production of additional carbon monoxide and hydrogen and for the removal of said catalyst from said hot gases; and withdrawing said liquid slag containing said catalyst.

2. A process for producing a carbon monoxide- and hydrogen-containing fuel gas which comprises: gasifying a fluid hydrocarbon fuel by partial oxidation with an oxygen-containing gas in a flame reaction in the presence of a dispersed finely divided catalyst to produce principally carbon monoxide and hydrogen, said catalyst being adapted to suppress the formation of carbon black in said gasification of said fluid hydrocarbon fuel and said catalyst consisting essentially of at least one compound of the group consisting of compounds of a metal of the iron group and compounds of an element of the second group of the periodic system; passing the resulting hot gases containing said finely divided catalyst through and in contact with a solid carbonaceous fuel arranged in a fixed bed and undergoing gasification with the formation of liquid slag for the production of additional carbon monoxide and hydrogen and for the removal of said catalyst from said hot gases; and withdrawing said liquid slag containing said catalyst.

3. A process for producing a carbon monoxide- and hydrogen-containing fuel gas which comprises: gasifying a fluid hydrocarbon fuel by partial oxidation with oxygen gas in a flame reaction in the presence of a dispersed finely divided catalyst to produce principally carbon monoxide and hydrogen, said catalyst being adapted to suppress the formation of carbon black in said gasification of said fluid hydrocarbon fuel and said catalyst consisting essentially of at least one compound of the group consisting of compounds of a metal of the iron group and compounds of an element of the second group of the periodic system; passing the resulting hot gases containing said finely divided catalyst through and in contact with a solid carbonaceous fuel arranged in a fixed bed and undergoing gasification with the formation of liquid slag for the production of additional carbon monoxide and hydrogen and for the removal of said catalyst from said hot gases; and withdrawing said liquid slag containing said catalyst.

4. A process as defined in claim 3 wherein the dispersed finely divided catalyst adapted to suppress formation of carbon black in said gasification of said fluid hydrocarbon fuel consists essentially of a nickel compound and a calcium compound.

5. A process for producing a carbon monoxide- and hydrogen-containing synthesis gas which comprises: gasifying a fluid hydrocarbon fuel by partial oxidation with an oxygen-containing gas in a flame reaction in the presence of a dispersed finely divided catalyst to produce principally carbon monoxide and hydrogen, said catalyst being adapted to suppress the formation of carbon black in said gasification of said fluid hydrocarbon fuel and said catalyst consisting essentially of at least one compound of the group consisting of compounds of a metal of the iron group and compounds of an element of the second group of the periodic system; passing the resulting hot gases containing said finely divided catalyst through and in contact with coarse-sized coke arranged in a fixed bed and undergoing gasification with the formation of liquid slag for the production of additional carbon monoxide and hydrogen and for the removal of said catalyst from said hot gases; and withdrawing said liquid slag containing said catalyst.

6. A process as defined in claim 1 wherein the said reaction of fluid hydrocarbon fuel is carried out in a gasification zone, and the said hot gases are introduced into the bottom part of a separate solid carbonaceous fuel gasification zone.

7. A process as defined in claim 1 wherein the said contacting of solid carbonaceous fuel with hot gases and gasification of the solid carbonaceous fuel are carried out in a gasification zone, and the said gasification of fluid hydrocarbon fuel is carried out in the bottom part of the same zone and in the vicinity of the point of introduction of the fluid hydrocarbon fuel into the zone.

8. A process as defined in claim 1 wherein the consumption of the fluid hydrocarbon fuel is greater than that of the solid carbonaceous fuel.

9. A process as defined in claim 1 wherein the dispersed finely divided catalyst adapted to suppress formation of carbon black in said gasification of said fluid hydrocarbon fuel consists essentially of at least one compound selected from the group consisting of nitrates and sulfates of iron, cobalt and nickel and nitrates, chlorides and hydroxides of magnesium, calcium, strontium and barium.

References Cited in the file of this patent

UNITED STATES PATENTS

| | | |
|---|---|---|
| 1,039,398 | Hirt | Sept. 24, 1912 |
| 2,482,866 | Phinney | Sept. 27, 1949 |